United States Patent [19]
Lamont

[11] Patent Number: 5,332,354
[45] Date of Patent: Jul. 26, 1994

[54] WIND TURBINE APPARATUS

[76] Inventor: John S. Lamont, 3000-360 Main St., Winnipeg, Manitoba, Canada, R3C 4G1

[21] Appl. No.: 91,432

[22] Filed: Jul. 15, 1993

[51] Int. Cl.$^5$ .............................................. F03D 3/04
[52] U.S. Cl. .................................... 415/4.2; 415/2.1; 415/907
[58] Field of Search .................... 415/2.1, 4.1, 4.2, 4.4, 415/905, 907

[56] References Cited

U.S. PATENT DOCUMENTS

| | | | |
|---|---|---|---|
| 171,962 | 1/1876 | Stephens et al. | 415/4.1 |
| 1,903,307 | 4/1933 | Gillio | |
| 2,667,589 | 1/1954 | Levrero | 290/55 |
| 3,944,840 | 3/1976 | Troll | 290/55 |
| 4,031,405 | 6/1977 | Asperger | 290/55 |
| 4,047,834 | 9/1977 | Magoveny et al. | 415/3 |
| 4,084,918 | 4/1978 | Pavlecka | 415/2.1 |
| 4,162,410 | 7/1979 | Amick | 290/55 |
| 4,179,007 | 12/1979 | Howe | 180/65 DD |
| 4,191,505 | 3/1980 | Kaufman | 415/2.1 |
| 4,278,896 | 7/1981 | McFarland | 290/55 |
| 4,288,704 | 9/1981 | Bosard | 290/55 |
| 4,350,900 | 9/1982 | Baughman | 415/907 |
| 4,398,096 | 8/1983 | Faurholtz | 290/55 |
| 4,490,623 | 12/1984 | Goedecke | 415/907 |
| 4,508,973 | 4/1985 | Payne | 290/55 |
| 5,038,049 | 8/1991 | Kato | 290/55 |
| 5,083,899 | 1/1992 | Koch | 415/2.1 |

FOREIGN PATENT DOCUMENTS 0380018  9/1923  Fed. Rep. of Germany ....... 415/4.2

*Primary Examiner*—Edward K. Look
*Assistant Examiner*—Mark Sgantzos
*Attorney, Agent, or Firm*—Burns, Doane, Swecker & Mathis

[57] ABSTRACT

A wind driven turbine installation has a rotatable enclosure with closable inlet and outlet openings. The rotatable enclosure includes a driving arrangement and a wind direction sensor arrangement that monitors the incident wind direction and aligns the enclosure such that the inlet opening is aligned with the prevailing wind direction. The inlet opening includes an acceleration passage which increases wind velocity and directs the wind to a wind driven turbine device disposed within the installation. The turbine device includes a converging inlet passage, a secondary inlet passage, and an exhaust passage. A turbine rotor is disposed within the turbine device such that wind entering the primary inlet drives the rotor in part by following rotor vanes, and in part by passing across the rotor vanes. Wind entering the secondary passage is redirected toward the primary inlet and drives the rotor in the forward direction. Wind from the secondary passage is confluent with wind from the primary inlet that passes through the rotor. The confluent air flow exhausts through the rotor at the exhaust opening where that portion of the primary air which follows the rotor is also exhausted. The wind turbine device may be mounted for rotation about a vertical axis within the secondary housing so as to adjust itself to the direction of the prevailing wind.

12 Claims, 8 Drawing Sheets

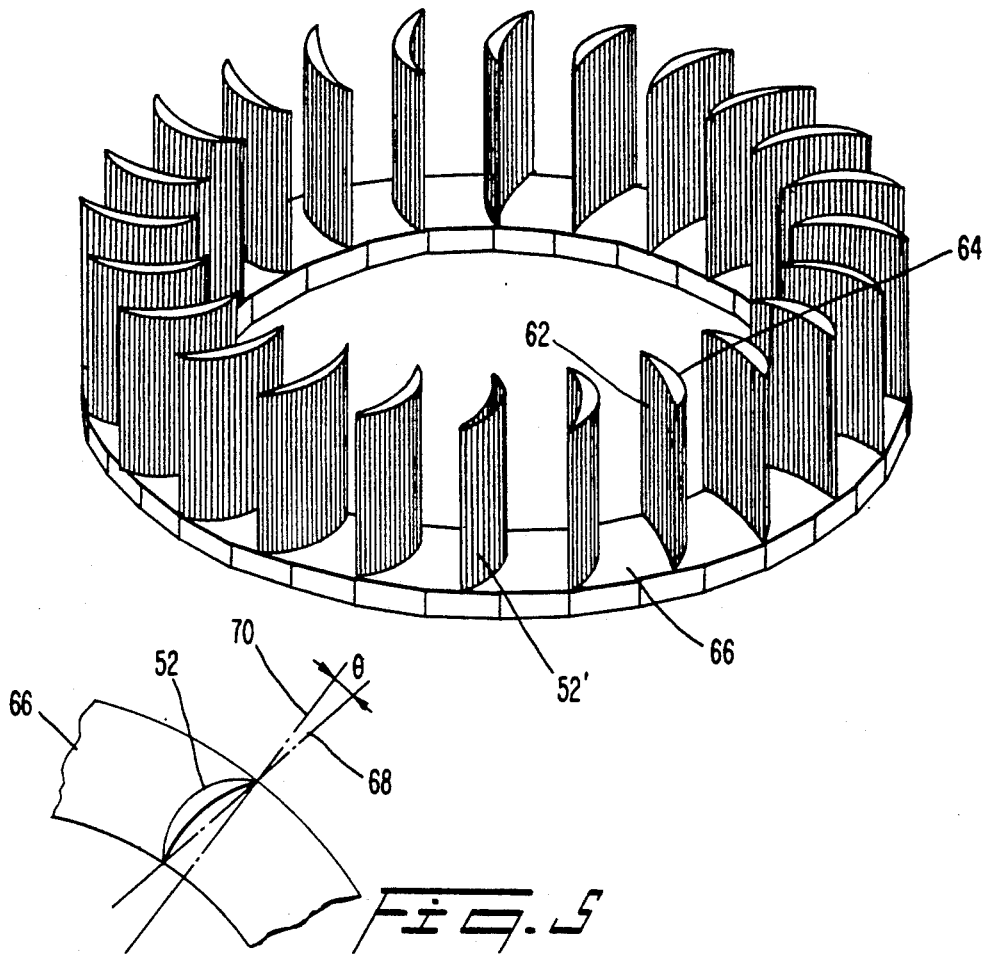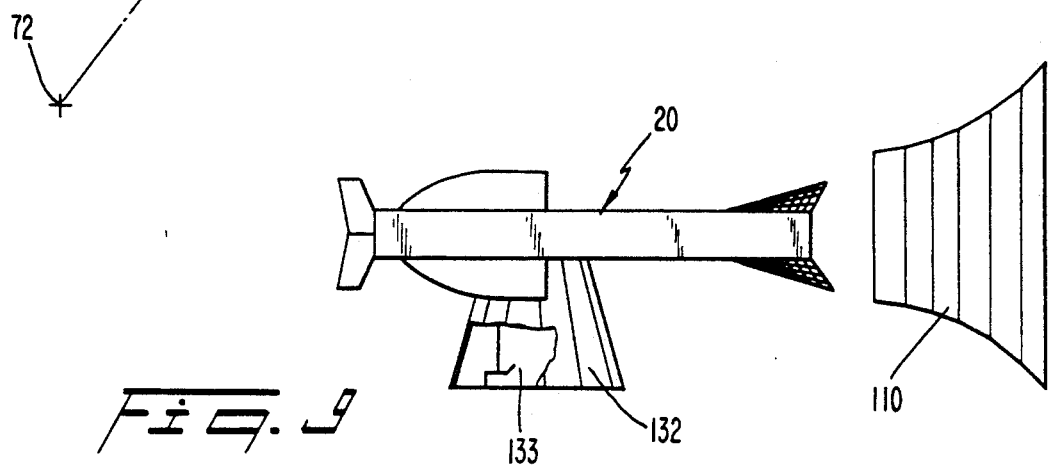

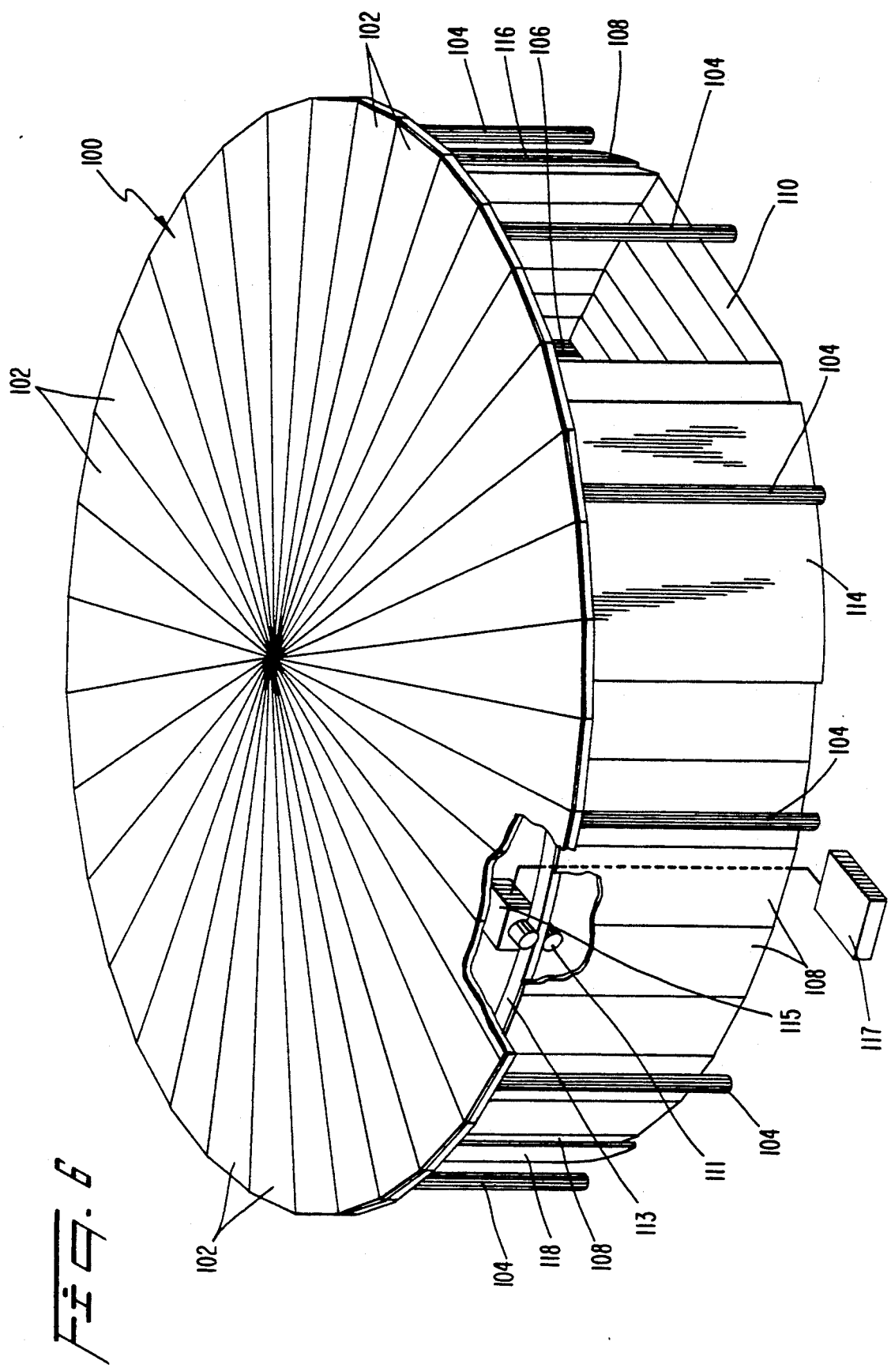

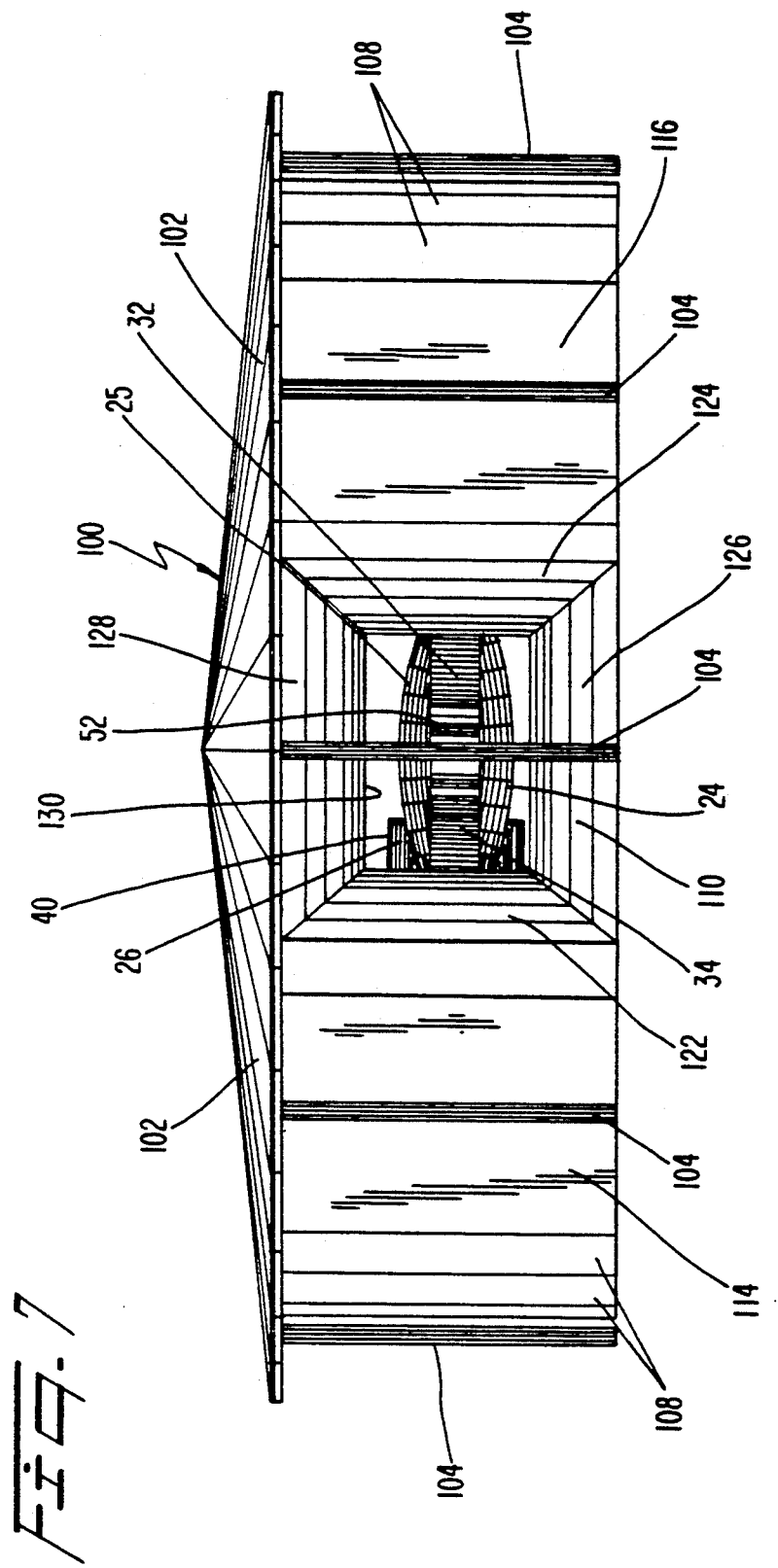

WIND TURBINE APPARATUS

BACKGROUND OF THE INVENTION

The present invention relates generally to wind driven turbines. More particularly, the invention concerns a partial admission centrifugal turbine powered by atmospheric wind to drive an electrical generator.

Wind driven generators are known in the art. For example, a wind powered generator using a wind driven rotor having a plurality of parallel vanes arranged circumferentially around a vertical axis has been used to drive a generator. A housing around the rotor has a movable inlet vane to direct wind toward one side of the rotor. The housing itself may be rotatable so as to adjust to the direction of oncoming wind. Further, if desired, the assembly can be mounted on top of an automobile. See U.S. Pat. No. 5,038,049, issued to Kato on Aug. 6, 1991.

Generators are also known in which air supplied by wind is separated into a plurality of parallel portions which are applied to different parts of the rotor. See U.S. Pat. No. 4,350,900, issued to Baughman on Sep. 21, 1982. Moreover, various configurations for wind driven vanes used in wind turbines are known, such as symmetric airfoil shaped vanes of the Baughman patent, straight but radially canted vanes (see U.S. Pat. No. 4,179,007 issued to Howe on Dec. 18, 1979), radially curved vanes without inlet flow direction (see U.S. Pat. Nos. 4,278,896, issued to McFarland on Jul. 14, 1981; 4,031,405, issued to Asperger on Jun. 21, 1977; and 2,667,589, issued to Levrero on Jan. 26, 1954), radially curved vanes with inlet flow direction (see U.S. Pat. Nos. 4,047,834, issued to Magoveny et al. on Sep. 13, 1977; and 1,903,307, issued to Gillio on Apr. 4, 1933), Darrieus type rotors (see U.S. Pat. No. 4,162,410, issued to Amick on Jul. 24, 1979). It is also known to provide a variable area throat arrangement for wind driven turbines. See, U.S. Pat. No. 3,944,840, issued to Troll on Mar. 16, 1976.

Other rotor arrangements, such as axial flow configurations, are also known, including for example, U.S. Pat. Nos. 4,508,973, issued to Payne on Apr. 2, 1985, 4,398.096, issued to Faurholtz on Aug. 9, 1983, and 4,288,704, issued to Bosard on Sep. 8, 1981.

In general, however, the known prior art devices use turbine blades like windmills, that is, wind is used to push the blades. Some prior art devices use the turbine blades such that wind aerodynamically interacts with the blades to drive them. However, the known prior art devices are not seen to use wind to push the blades in part of a blade channel while aerodynamically driving the blades at other parts of the channel, while substantially all of the blade cascade is used to drive the turbine with one and/or the other wind-and-blade interaction. Accordingly, the prior art devices do not use the atmospheric power source in the most advantageous manner.

SUMMARY OF THE INVENTION

A wind driven turbine which overcomes the problems and disadvantages of the prior art devices includes a plurality of turbine blades arranged circumferentially in a rotor about an axis of rotation, and parallel with that axis. The rotor is mounted in a housing which provides a primary air inlet, a secondary air inlet, an air outlet, and a baffle means for directing air flow from the primary and secondary air inlets to the air outlet such that a portion of the ingested air passes through the turbine blades once, a second portion of the ingested air passes through the turbine blades twice, and the secondary air flow passes through the turbine blades twice.

By arranging the secondary air inlet near the air outlet, the arrangement permits the primary air flow to drive turbine blades receding from the primary air inlet while the secondary air flow drives turbine blades advancing toward the primary air inlet. Accordingly, an increased mechanical advantage on the rotating turbine blades is obtained.

To direct the primary air flow toward the receding turbine blades, the primary air inlet defines a channel which is asymmetric with respect to the housing when viewed in a plane perpendicular to the axis of rotation. With such an arrangement, the primary air flow receives directional bias toward the concave side of the turbine blades as well as a flow component tangential to the axis of rotation. Accordingly, the primary air flow splits so that a first part pushes the receding turbine blades through the blade channel of the housing while a second part of the flow aerodynamically drives the turbine blades while flowing radially inwardly over them and into a central channel of the housing. That second part exhausts from the central channel, passing radially outwardly through the turbine blades and into the outlet opening thereby aerodynamically driving the turbine blades a second time. Meanwhile, the first part of the primary air flow joins the second part at the outlet opening.

The secondary air flow may be collected axially above and below the turbine rotor and exhausted directly into the rotor channel from a position near the outlet opening. In this fashion, the secondary air flow is obtained from relatively undisturbed air passing above and below the turbine housing. The secondary air drives the turbine blades forwardly toward the primary air inlet until there is fluid communication with the central channel of the turbine housing. The secondary air is confluent with the second part of the primary air flow, and in the same manner as the primary air flow, passes in aerodynamic driving relationship through the turbine blades and exhausts through the outlet opening.

The turbine housing is mounted for rotatable movement about a vertical axis parallel to, and preferably coincident with, the rotational axis of the turbine rotor. The turbine housing includes means responsive to wind pressure to align the primary air inlet with the prevailing wind direction. Accordingly, the wind turbine is self positioned relative to the wind.

For large installations, such as on the roof of a building, a secondary housing may be provided to shroud the entire wind turbine. That housing is preferably rotatable about the same vertical axis as that around which the wind turbine itself is rotatable. Preferably, the secondary housing includes a control system which rotates it to align the axis of its opening with the prevailing wind direction.

To increase both the mass flow rate and the velocity of wind entering the primary inlet of the wind turbine, the secondary housing inlet includes convergent walls. Additionally, the longitudinal axis through the convergent inlet is aligned to intersect the axis of rotation for the wind turbine housing to thereby deliver the wind energy efficiently to the wind turbine. The convergent walls of the housing inlet define an outlet that is narrower but higher than the wind turbine primary inlet. Such an arrangement allows some tolerance in the angular alignment between the wind turbine and the inlet axis of the secondary housing thereby accommodating lateral perturbations in the prevailing wind direction. Furthermore, the wind passing above and below the wind turbine primary inlet can be collected by the secondary inlet to enhance operation of the wind turbine.

BRIEF DESCRIPTION OF THE DRAWINGS

Many objects and advantages of the wind turbine according to the present invention will be apparent to those skilled in the art when this specification is read in conjunction with the attached drawings wherein like reference numerals are applied to like elements and wherein:

FIG. 4 is a schematic perspective view of the turbine rotor of the wind turbine of FIG. 1;

FIG. 5 is a schematic view of the arrangement of a turbine blade on the turbine rotor;

FIG. 6 is a schematic perspective view of a secondary housing for the wind turbine of FIG. 1;

FIG. 7 is a side elevation of the secondary housing of FIG. 6 showing the wind turbine inside the inlet opening;

FIG. 9 is a side view of the wind turbine in the secondary housing; and

DESCRIPTION OF THE PREFERRED EMBODIMENT

Figure 1:
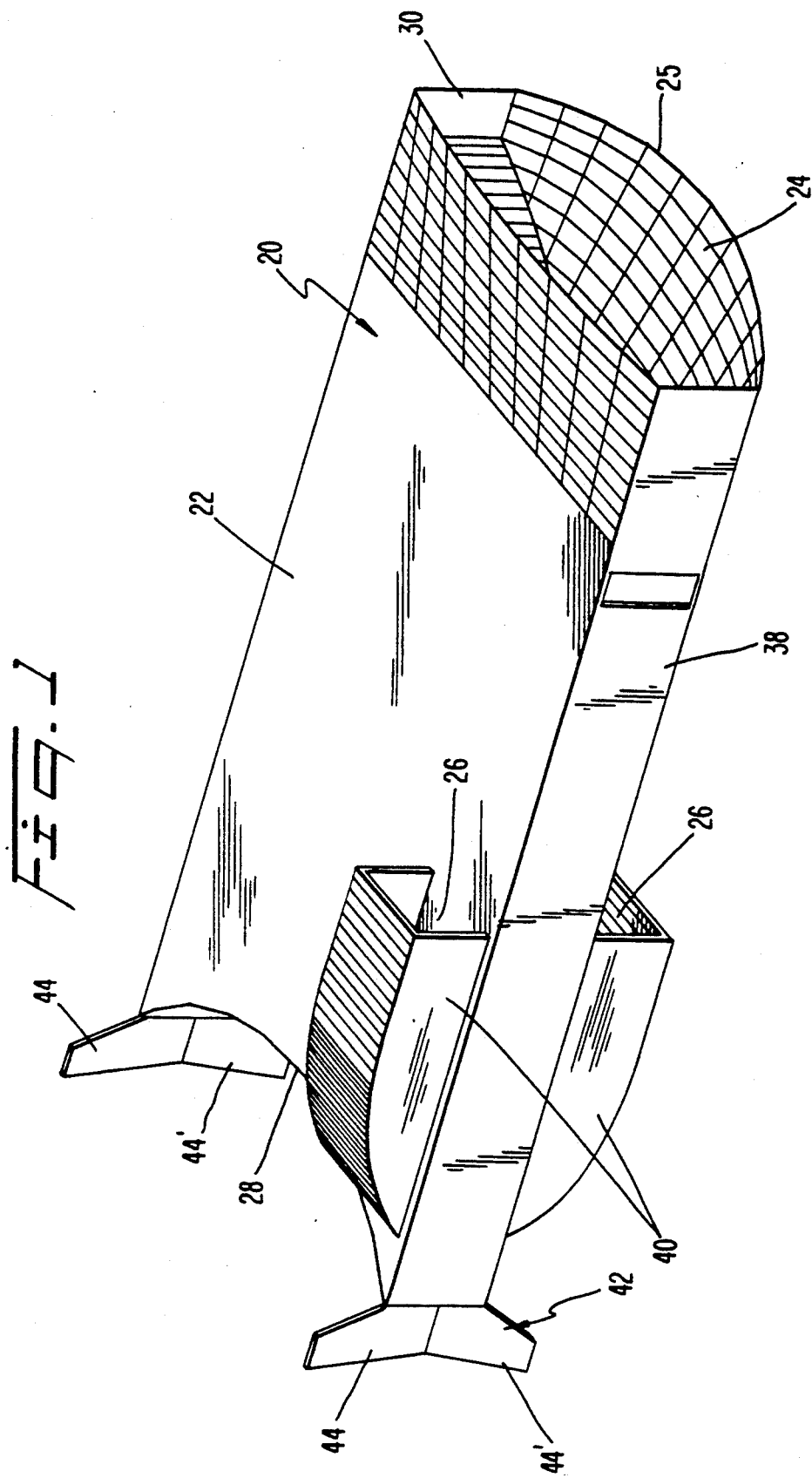
FIG. 1 is a schematic perspective view of a wind turbine according to the present invention.

A wind driven turbine assembly 20 (see FIG. 1) includes a primary housing 22 which may be fashioned from sheet metal, plastic material, fiber reinforced composite material, or any other suitable conventional engineering material. Since the entire structure of the turbine assembly 20 needs to be responsive to wind direction, it is important that all materials used in the construction be as light as possible. To this end, sheet material can be used as much as possible to assure that the structure is light.

The housing 22 preferably includes a primary inlet opening 24, at least one secondary inlet opening 26, and an exhaust opening 28. These various openings communicate with one another through internal flow passages in the manner to be described.

The primary inlet opening 24 is positioned at one end of the housing 22 and includes an entry portion 30 which defines a capture area having substantially constant cross-sectional area. Moreover, the forward edge 25 of the primary inlet opening 24 curves outwardly at the center (see FIG. 3). In addition, the forward edge 25 of the top curves upwardly while the forward edge of the bottom curves downwardly (see FIG. 7). The outward curvature of the forward edge 25 above the top and below the bottom is effective to increase the capture area for the turbine assembly 20. The outward curvature of the forward edge 25 forwardly of the turbine assembly 20 provides an arcuate capture area across the front of the turbine assembly 20.

Figure 2:
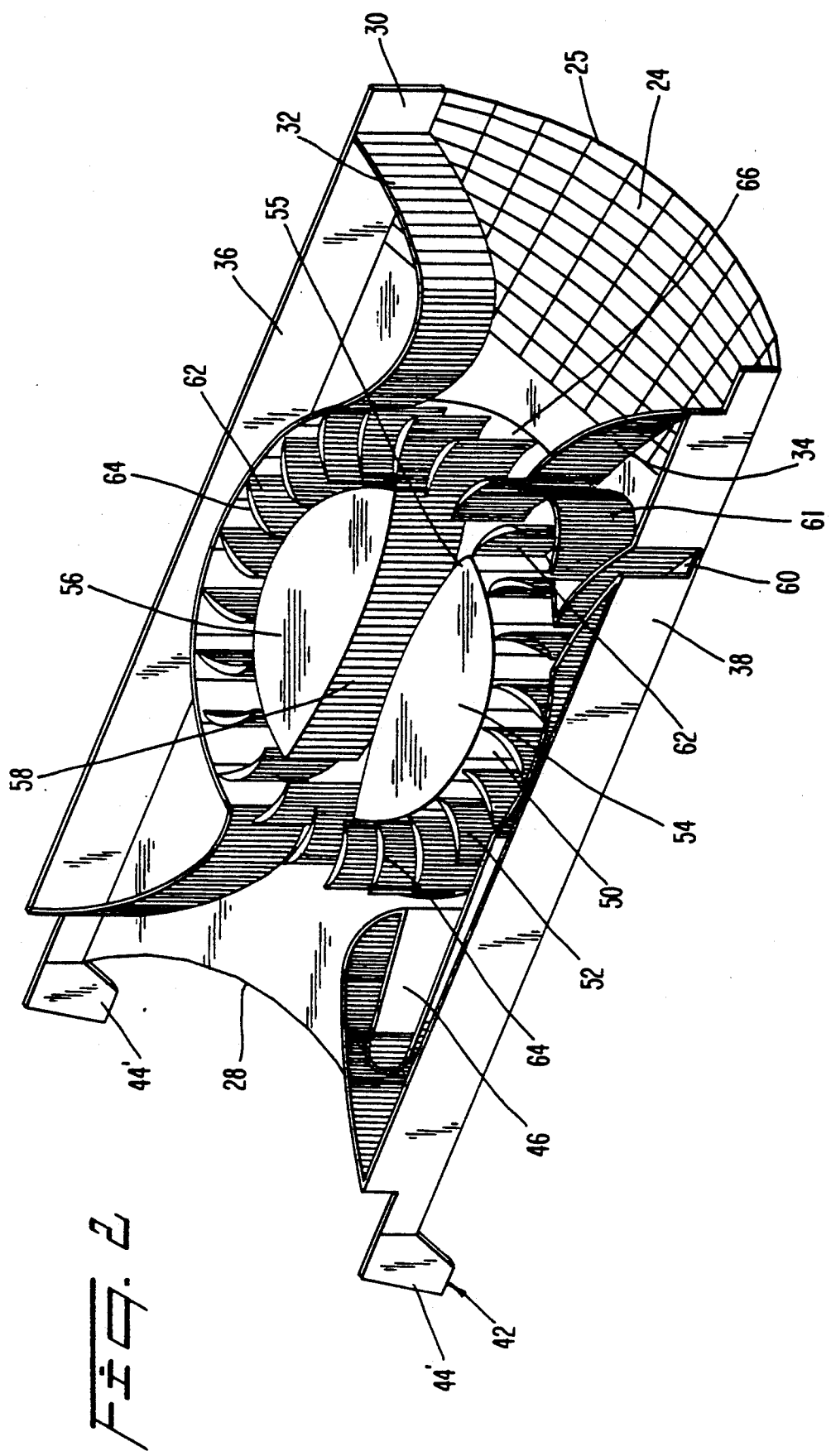
FIG. 2 is a is a schematic perspective view of the wind turbine of FIG. 1 with the top removed but the central baffles left in place.

As can be seen more clearly in FIG. 2, internal walls 32, 34 of the inlet define a constriction in the cross-sectional flow area within the housing 22. Moreover, these internal walls 32, 34 are asymmetrical relative to a longitudinal axis through the turbine assembly 20 and asymmetrical to a vertical plane containing the longitudinal axis and the axis of rotation. With this arrangement of the internal walls 32, 34, wind entering the primary inlet opening 24 receives a lateral velocity component directed toward a first sidewall 36 of the housing 22. That lateral velocity component is, in addition tangentially directed to a turbine rotor contained in the housing 22.

The secondary inlet opening 26 (see FIG. 1) is preferably disposed near a second side wall 38 of the housing 22 and closer to the exhaust opening 28 than to the primary inlet opening. The secondary inlet is preferably defined in part by a cowling 40 secured to the top surface of the housing 22. As illustrated, the portion of the cowling 40 most closely adjacent to the exhaust opening 28 is preferably faired so that air flows smoothly over the cowling 40 with minimal turbulence. A pair of symmetrically disposed secondary inlet openings, each with a corresponding cowling 40, is preferred. Such an arrangement collects air from above the top surface of the housing and from beneath the bottom surface of the housing. Symmetry of the secondary inlet openings 26 about a horizontal plane passing through the middle of the turbine assembly 20 balances the forces on the housing 22 imposed by collection of the secondary air flows.

Positioned at the back end of the housing 22 is a guidance means 42 for directing the primary inlet opening into general alignment with direction of ambient wind. The guidance means 42 preferably includes a symmetric pair of directional fins 44, 44' which, respectively, extend above the top surface and below the bottom surfaces of the housing 22. These directional fins 44, 44' are proportioned to effectively swing the wind turbine assembly 20 about a vertical axis so that the inlet opening 24 is properly positioned. Considering that the secondary inlet openings 26 are symmetrical to a horizontal plane while being asymmetrical to the vertical axis, the directional fins 44, 44' may be canted or inclined relative to the plane of the associated sidewall 36, 38 by a predetermined angle. In such a manner, the directional fins 44, 44' will compensate for the asymmetry of forces imposed by the secondary inlet openings relative to the vertical axis.

While the fins 44, 44' are illustrated as being generally plate like appendages, their shape and location are not important. The important aspect is the efficacy of the guidance means 42 to compensate for unbalanced forces associated with the secondary inlet openings 26 and to keep the primary inlet opening 24 aligned with the ambient wind. Furthermore, if desired, the guidance means 42 can be controllable so that it generates different force levels as may be necessary at different wind velocities to properly orient the inlet opening 24 with the ambient wind direction.

As can best be seen from FIG. 2, a baffle arrangement inside the housing 22 for directs airflow between the primary inlet 24, the exhaust or outlet opening 28, and a secondary airflow plenum chamber 46. The secondary airflow plenum chamber 46 is in fluid communication with the back portion of each secondary inlet opening 26 through corresponding openings 80 (see FIG. 3) in the upper and lower housing surfaces. Those openings 80 are covered by the cowlings 40 (FIG. 1) which cooperate to direct the secondary airflow from the secondary inlet openings 26 to the openings 80 and then into the plenum chamber 46. The baffle arrangement (FIG. 2) also defines an annular path 50 in which an annular cascade of turbine vanes 52 is positioned. This annular path 50 provides the principal flow path for air between the primary inlet 24 and the outlet opening 28. In order to efficiently use the energy from wind, the radial clearance between the blades 52 and the walls of the annular channel 50 are selected to be as small as reasonably possible, thereby preventing air leakage over and around the blades 52.

A central part of the baffle arrangement defines the inner surface of the annular path 50 and is divided into two portions 54, 56. These portions 54, 56 further define a secondary passage or channel 58 between the primary inlet 24 and the outlet 28. Each portion 54, 56 has a first wall facing, and partially defining, the annular path 50 as well as a second wall facing, and partially defining, the central secondary channel 58. Preferably, these portions 54, 56 are attached to the cover of the turbine assembly. In some structural arrangements of the housing itself, a cover plate may extend between the first and second walls at the top of these portions as well as at the bottom thereof. As can be seen in the attached figures, the two portions 54, 56 are substantially mirror images of one another, with the exception of the inlet end 55 of the first portion 54 (see FIG. 3). The inlet end 55 may be rounded, or faired, to facilitate the flow of air from the annular path 50 into the central channel 58 defined between the two portions 54, 56. The precise contour for the inlet end 55 may be varied to accommodate conventional design parameters and flowpath analyses.

Positioned in the outer wall of the annular path 50 between the secondary airflow plenum chamber 46 and the primary inlet 24 is controlled vent passage 60. The vent passage 60 is defined by the baffle arrangement and extends between the annular path 50 and the second sidewall 38 of the primary housing 22. A suitable conventional valve, such as a flat plate pivotable about a vertical axis, may be installed, for example, at the outlet of the vent passage 60 to regulate airflow therethrough. Other positions for such a valve arrangement in the vent passage are also possible and may be preferred for various reasons. This vent passage 60 is considered to be an option to the baffle arrangement for use in application where secondary inlet airflows would interfere with the primary airflow. In such circumstances, the vent passage 60 can be opened to vent excess secondary airflow to the atmosphere.

The outer wall of the annular path 50 can be relieved radially outwardly at the end adjacent to the inlet wall 34. Particular proportions of the chamber 61 which is formed in that outer wall can be selected so as to provide the best aerodynamic behavior for air flowing in the path 50 toward the inlet 24 for discharge into the channel 58. Important characteristics of the chamber 61, however, are that it be faired to promote smooth airflow with minimal turbulence. The chamber 61 can function to reduce or minimize turbulence between (a) the primary airflow entering through the primary inlet and (b) the secondary airflow advancing from the plenum chamber 46.

Each blade 52 in the annular cascade is generally cylindrical in shape in that the generatrix of the walls moves in a closed path in a plane. Moreover, each blade 52 has a concave wall portion 62, and a convex wall portion 64. The convex wall portion 64 protrudes in the direction of circular movement of the annular cascade 52 about a vertical axis of rotation. One end of each blade 52 is attached to a rotor 66 (FIG. 4) with a cantilever mounting arrangement, the combination of the blades 52 with the rotor 66 being a wind turbine means. The rotor 66 may be detachably connected to a vertical axle so that the rotor is readily interchangeable with other rotors designed for particular operating conditions.

Since the turbine means is to be driven by naturally occurring wind, it is ordinarily important that the turbine means be as light as possible. Where lightest possible weight is desired, the turbine blades may be hollow so as to minimize their weight, see for example the blade 52' where the top end closure has been removed to show the hollow configuration. A light weight foam material may, if desired, be disposed inside the blades to enhance their stiffness while maintaining the necessary low weight attribute.

Other considerations, including operating conditions where the ambient wind has erratic velocity perturbations, may dictate that blade design be adjusted to other than the lightest possible weight. For example, where the ambient wind is gusty, heavier blades may be desired to get the advantage of momentum and inertia that would come from a greater mass. Such increased momentum and inertia should dampen fluctuations in turbine wheel rotational rate that otherwise could result from such wind speed variations.

For light weight wind turbine installations, it is further contemplated that the rotor assembly will be designed so as to be easily replaceable. In this way, several turbine rotor assemblies can be designed, each for a different wind velocity. By simply removing the cover for the wind turbine assembly, the turbine rotor assembly is accessible and can be readily exchanged for a different turbine assembly adapted for the expected wind conditions. Thus, such interchangeable turbine rotor assemblies permit the operation to be tailored to the ambient wind conditions.

Furthermore, it may be desirable to use replaceable baffles 54, 56 in the center of the turbine assembly to accommodate different operating conditions. To this end it is contemplated that a variety of turbine assembly covers may be provided, each having differently shaped contours for the replaceable baffles 54, 56. For example, baffles with different throat area dimensions may be provided, as well as baffles where the throat area dimensions are the same but different passage contours and/or configurations are provided. With this flexibility in design of the internal baffles 54, 56 operating conditions for the wind turbine can be optimized.

While blade design may be optimized further, it is presently envisioned that each blade 52 is mounted on the rotor 66 (see FIG. 5) such that a chord line 68 extending between the radially outer edge of the blade 52 and the radially inner edge of the blade 52 makes an angle $\theta$ with a radial line 70 passing through the center of rotation 72 and the radially outer edge of the blade. The angle $\theta$ is measured as positive in the circumferential direction opposite to the direction of turbine rotation. Preferably, the angle $\theta$ is selected to be greater than zero so that the radially inner edge of the blade is angularly disposed in an advanced position relative to the radially outer edge of the blade.

Figure 3:
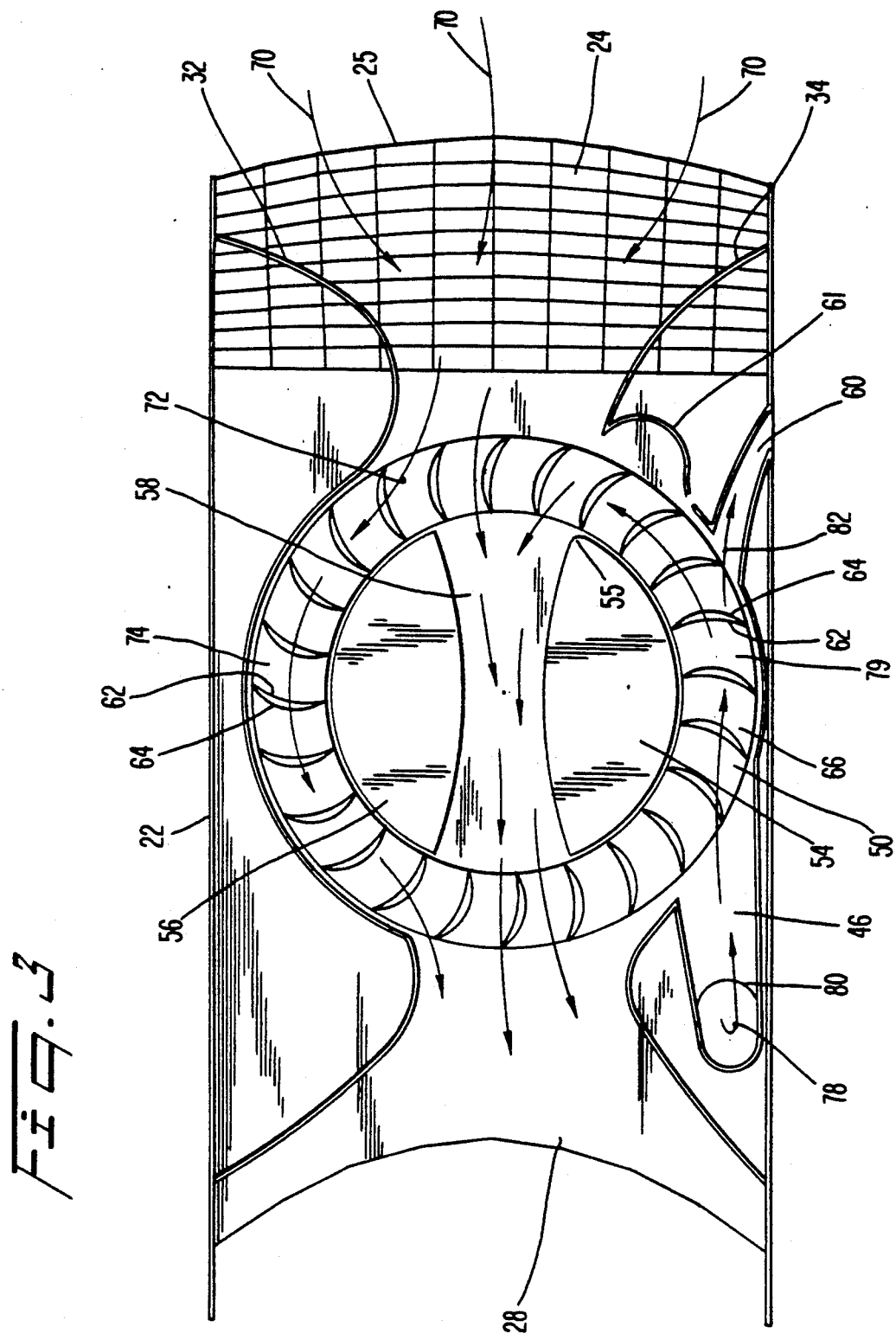
FIG. 3 is a schematic plan view of the wind turbine of FIG. 1.

Operation of the wind turbine assembly when exposed to ambient wind can best be understood from FIG. 3. As the ambient wind, or primary airflow, 70 enters the primary inlet opening 24, it accelerates to pass through the converging cross-sectional area defined by the first and second internal walls 32, 34 in conjunction with the upper and lower surfaces of the flow path. The asymmetric arrangement of these internal walls 32, 34 induces a secondary velocity component in the primary airflow, which component is transverse to the longitudinal axis of the housing 22. More particularly, the secondary velocity component is directed tangentially of the turbine rotor 66.

A first portion 72 of the primary airflow 70 enters a primary portion 74 the annular path 50 and pushes the turbine blades 52 through that primary portion 74—thus driving the rotor. A second portion 76 of the primary airflow 70 simply passes radially through the annular blade cascade to the central channel 58. As that second portion 76 passes through the annular cascade between the inlet opening 24 and the central channel 58, it aerodynamically interacts with the blades 52 and imparts tangentially directed forces thereon, also causing rotation of the turbine rotor 66 about its axis.

Simultaneously, a secondary airflow 78 collected by the cowling 40 (FIG. 1) enters the secondary airflow plenum chamber 46 through the opening 80 (FIG. 3) in the housing. That secondary airflow 78 enters a secondary portion 79 of the annular path 50 extending from the plenum chamber 46 to the primary inlet opening 24 and pushes the blades 52 forwardly toward the primary inlet 24. Should the secondary airflow 78 be so great that it adversely affects the primary airflow 70, a portion 82 of the secondary airflow can be bled off through the vent channel 60 and dumped to the atmosphere. The remaining portion of the secondary airflow 78 moves forwardly into confluence with the second part 76 of the primary airflow 70 and enters the central channel 58.

The combined flow of the second part of the primary airflow and the secondary airflow pass through the central channel 58 where the combined flow may be accelerated by a cross-sectional area restriction. While that area restriction is symmetrically located relative to the axis of rotation in FIG. 3, the area restriction can be positioned at the downstream end of the channel—or at any other desired location. This accelerated combine flow then moves radially outwardly across the blades 52 of the annular cascade, aerodynamically driving the turbine means, and exhausting through the outlet opening 28. At the outlet opening 28, the first part 72 of the primary airflow 70 is confluent with the other part of the primary airflow and the secondary airflow.

As a consequence of this arrangement of primary and secondary airflows, the turbine means is driven in the rearward direction by part of the primary airflow and is driven in the forward direction by the secondary airflow. Moreover, the turbine rotor is driven aerodynamically at both the inlet and exhaust locations where air enters and leaves the central channel 58. Meanwhile, the turbine is driven impulsively by the primary and secondary airflows in the annular path or channel 50.

The turbine rotor may, for example, be attached to a suitable conventional electric power generator which converts the rotational energy imparted to the turbine by the primary and secondary airflows into electrical energy.

The wind turbine of this invention may be used in a variety of environments and may be scaled, or sized, as necessary for efficient utilization of wind energy. A small unit could be mounted on a car to supplement or supply the electrical requirements. Larger units might be used in open areas for supplementation and/or supply of household electricity requirements. Even larger units may be used on buildings as a supplement to the electrical power requirements.

One large scale installation suitable for use of a wind turbine might involve mounting the wind turbine on the roof of a building to gain access to stronger winds and to minimize air current distortions from adjacent structures. A roof-top installation envisioned here includes a secondary housing 100 (FIG. 6) having a roof structure 102 supported on at least one generally circular array of columns 104. If necessary to support the weight of the roof, a second set of columns 106 (FIG. 8) may be disposed inside the housing 100. While the sidewall 108 is shown as being circular, there may be other configurations that would be preferred or that may have further advantages. For example, a structure which is symmetric about a vertical plane containing the axis of rotation could have a width which is smaller than its length so that the sidewall itself would have a preferred orientation relative to the wind and would exhibit some self-orientation tendencies.

Figure 8:
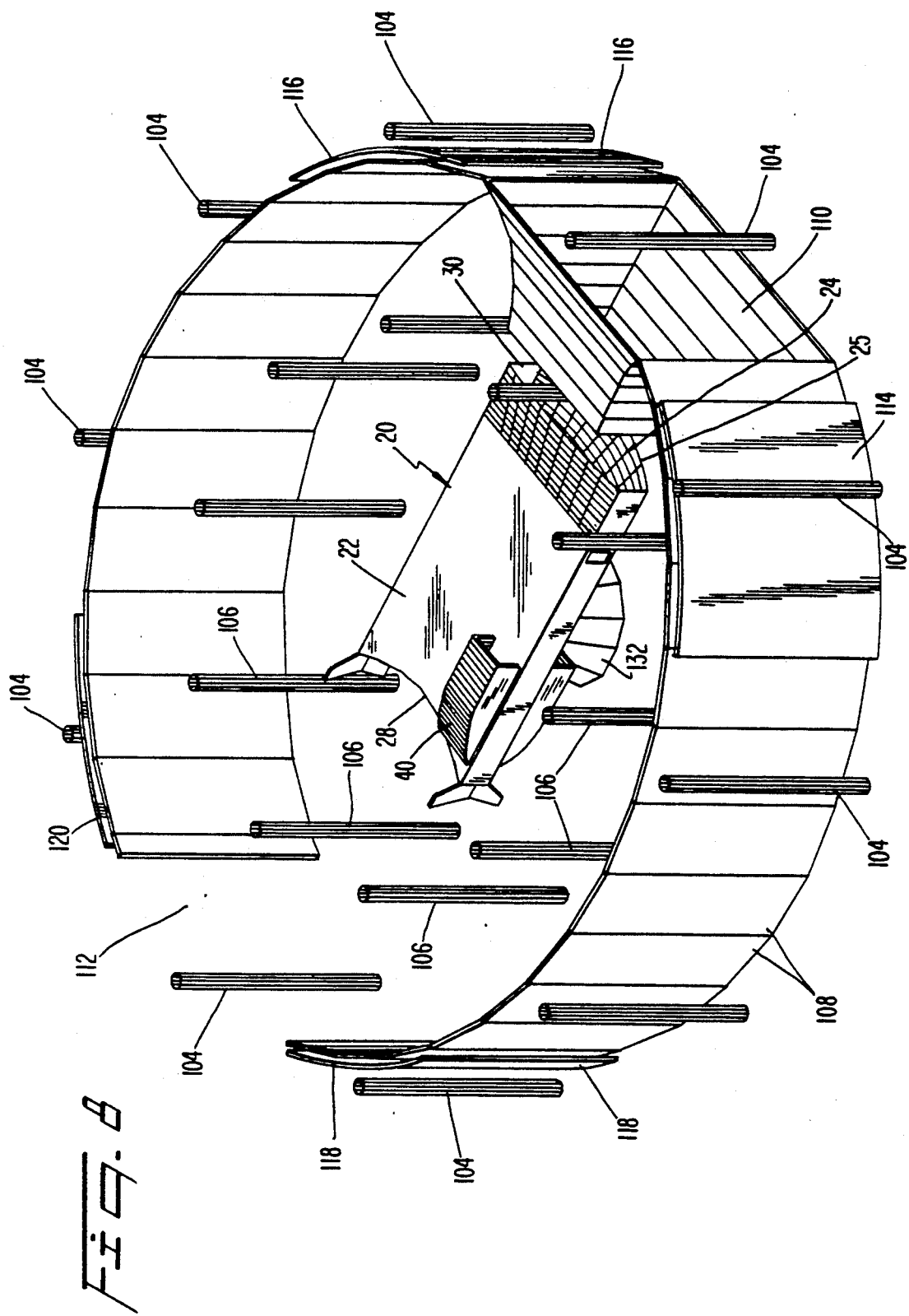
FIG. 8 is a perspective view of the secondary housing of FIG. 6 with the top removed to show the arrangement of the wind turbine.

The secondary housing 100 also includes a sidewall 108 (FIG. 6) arranged to hang from the roof structure 102. The sidewall 108 has an inlet opening 110 and a discharge opening 112 (FIG. 8). The sidewall 108 is suspended from the roof structure 102 in such a way that the sidewall 108 can be rotated about a vertical axis in order to orient the inlet opening 110 in the direction of the prevailing wind. While a variety of arrangements will be apparent to those skilled in the art, a possible suspension arrangement might involve a plurality of rollers 111 mounted to the roof structure for rotation about horizontal axes and supporting, on top of the rollers, a ring 113 from which the sidewall 108 is suspended. A suitable conventional motor drive assembly 115 may then be provided to drivingly engage the ring and move the sidewall 108 relative to the roof structure 102. A suitable conventional wind direction sensing device 117 is employed to determine the prevailing wind direction. That wind direction sensing device is operatively connected with the motor drive assembly to move the sidewall 102 so that its inlet opening 110 is properly positioned.

To accommodate those situations where the wind turbine is to be shut down, e.g. for repair, or those situations where the prevailing wind has too high a velocity, both the inlet opening 110 and the outlet opening 112 are provided with a set of control doors. The inlet opening control doors 114, 116 are mounted to be controllably driven so as to slide relative to the sidewall 108. Likewise, the exhaust opening control doors 118, 120 are mounted to be controllably driven so as to slide relative to the sidewall 108. In this manner, the front control doors 114, 116 can be positioned in a continuous range of positions between fully exposing the inlet opening 110, partially covering the inlet opening 110, and fully closing the inlet opening 110. The rear control doors 118, 120 can be positioned with the same range of functional positions as the front control doors 114, 116.

So as to direct ambient wind and accelerate that wind to the turbine assembly 20, the inlet opening 110 is further defined by curved walls (FIG. 7). The inlet sidewalls 122, 124 are symmetrical to a vertical plane passing through the center of the inlet opening 110 and the vertical axis of the housing 100. Similarly, the inlet top wall 128 and the inlet bottom wall 126 are symmetrically disposed relative to a horizontal plane passing through the center of the inlet opening 110. These symmetrical pairs of inlet walls define a restricted area opening 130 having a width that is slightly smaller than the width of the wind turbine assembly 20 and having a height which is larger than the vertical height of the wind turbine assembly 20. With this arrangement, the inlet opening 110 supplies a uniform velocity air stream across substantially the entire width of the wind turbine assembly 20 while that same air stream velocity is provided to the secondary inlet openings 26 of the wind turbine assembly 20.

The wind turbine assembly 20 is itself mounted for rotation about a vertical axis on a pylon 132 (FIG. 8). Considering that the turbine assembly 20 should be self-adjusting to the wind direction through action of the guidance means 42, the assembly 20 is preferably mounted to the pylon 132 by a large diameter, low friction bearing, such as a ball bearing. When the turbine assembly is a large scale installation, it may also be desired to provide a motor drive to augment, or even completely replace, the aligning action of the guidance means 42.

Where a second set of roof support columns 106 is used, the wind turbine assembly 20 is positioned so that it can freely rotate within the secondary roof support columns 106 at a substantially constant radial distance therefrom. Moreover, the inlet opening 110 and associated sidewalls are designed to extend toward the turbine assembly 20 so as to provide the closest reasonable radial proximity between the discharge opening 130 and the wind turbine inlet (FIG. 9). Where the second roof support columns 106 are used, that closest reasonably proximity will be sufficient to provide radial clearance between the inlet opening structure and the columns 106 as well as radial clearance between the wind turbine assembly 20 and the columns 106.

In an installation such as that shown, an electrical generator 133 can be placed within the support pylon 132. In that way the generator is in close proximity to the turbine means as well as being in a protected housing.

Figure 10:
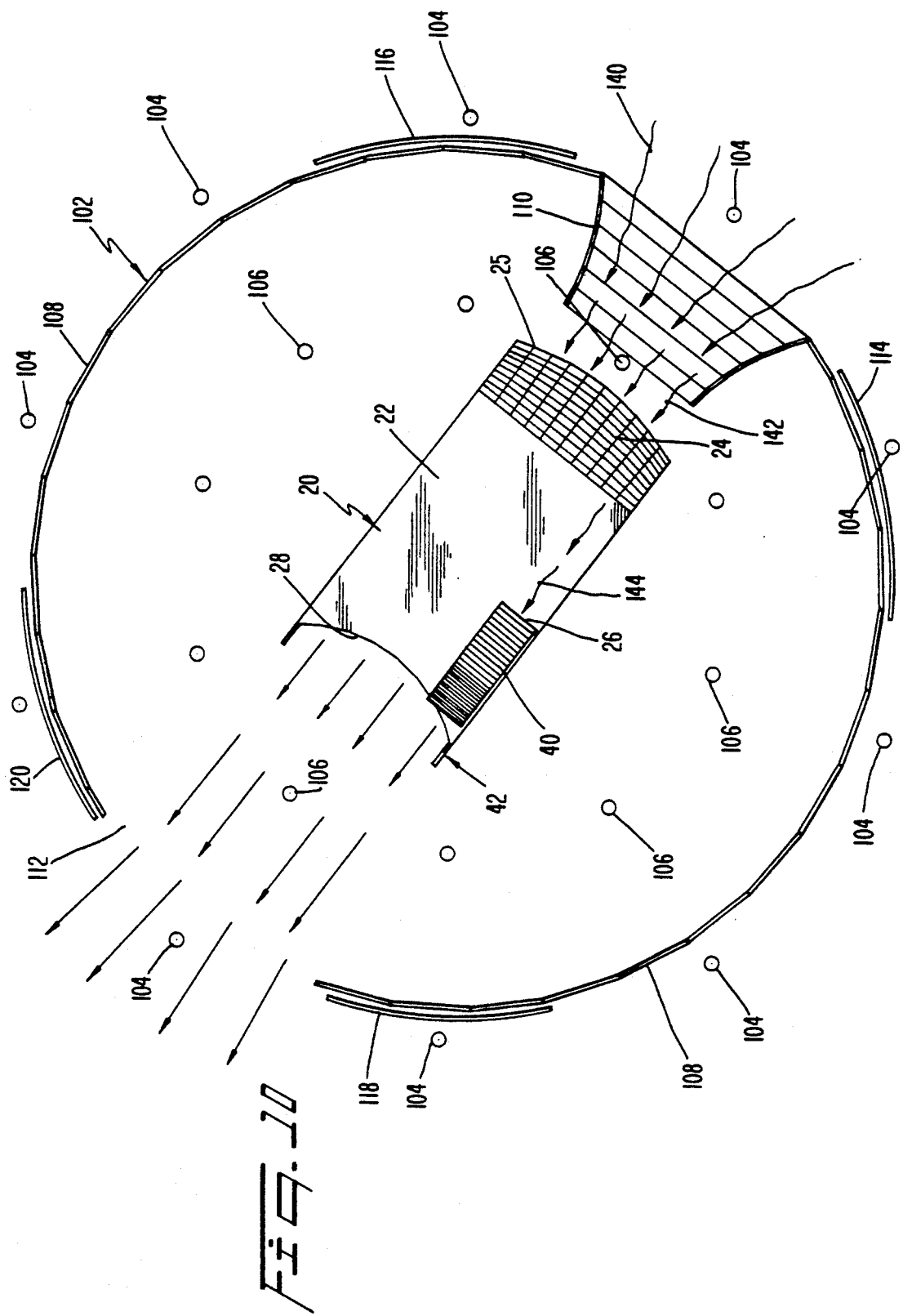
FIG. 10 is a top view of the secondary housing arrangement with the roof removed.

During operation of the installation (FIG. 10), the sidewall assembly 108 is driven so that the axis of symmetry for the inlet opening 110 and its structure is in general alignment with the prevailing wind direction. As the wind 140 blows it enters the inlet opening 110 and is accelerated by the convergent area passage of the inlet opening sidewalls. A major portion of the accelerated flow 142 enters the primary inlet of the wind turbine assembly 20. Another portion 144 of the accelerated flow 142 which bypasses the inlet opening 24 enters the secondary inlet openings 26 of the wind turbine assembly 20. Ultimately, the air streams that pass through the turbine assembly 20 are exhausted therefrom and pass out of the secondary housing 100 through the discharge opening 112.

That part of the accelerated flow 142 which does not pass through the turbine assembly 20 is available to interact with the positioning or guidance means 42 of the turbine assembly 20 so as to move the primary inlet 24 into general alignment with the inlet opening 110—that is, the longitudinal axis of the turbine assembly 20 is in general alignment with the longitudinal axis through the inlet opening 110.

Perturbations in the direction of prevailing wind are readily accommodated by this installation. For example, by sizing the discharge opening 130 of the inlet 110 so that it is narrower than the primary turbine inlet opening, predetermined angular perturbations of wind direction will not affect the mass flow of air entering the turbine assembly 20. Moreover, by mounting the wind turbine assembly 20 for rotation independently of the sidewall structure 108, the wind turbine assembly 20 can react more quickly to wind direction perturbations by virtue of its lower inertia.

From the foregoing it will now be apparent that a novel wind turbine assembly and a novel wind turbine installation have been disclosed which overcome problems of the type faced by the prior art. Moreover, it will be apparent to those skilled in the art that numerous variations, modifications, substitutions, and equivalents exist for features of the invention which do not materially depart from the spirit and scope of the invention. Accordingly, it is expressly intended that all such variations, modifications, substitutions, and equivalents which fall within the spirit and scope of the invention as defined in the appended claims be embraced thereby.

What is claimed is:

1. A wind driven turbine device comprising:
   a housing having a primary inlet opening, a secondary inlet opening, an outlet opening, and guidance means for orienting the primary inlet opening into general alignment with atmospheric wind;
   annular turbine means for generating rotary power from atmospheric wind, rotatably mounted within the housing for movement in response to atmospheric wind movements;
   baffle means for directing wind through the housing and the turbine means, the baffle means connecting the primary inlet opening, secondary inlet opening, and the outlet opening of the housing while defining an annular path for the turbine means, directing a first portion of wind from the primary inlet through a first portion of the annular path, directing wind from the secondary inlet through a second portion of the annular path and into confluence with a second portion of wind from the primary inlet, and directing confluent second portion of wind from the primary inlet and wind from the secondary inlet outwardly through the turbine means to the outlet; and
   mounting means attached to the housing for rotatably supporting the housing while permitting movement of the housing about an axis.

2. The wind driven turbine of claim 1 wherein the turbine means includes a plurality of vanes each having a concave side and a convex side, each vane being mounted in an annular cascade such that wind from the primary inlet opening can flow radially inwardly across the turbine means.

3. The wind driven turbine of claim 1 wherein the inlet opening of the housing defines a region of converging cross sectional area to increase the velocity of wind approaching the turbine means.

4. The wind driven turbine of claim 3 wherein the inlet opening includes a region of constant cross sectional area upstream of the converging cross sectional area portion.

5. The wind driven turbine of claim 1 wherein the housing includes a pair of symmetrically disposed secondary openings and a corresponding pair of inlet scoops in fluid communication with the respective secondary openings and arranged to capture atmospheric wind bypassing the primary inlet opening.

6. The wind driven turbine of claim 1 wherein the baffle means directs wind from the primary inlet opening so as to induce a velocity component tangential to the turbine means.

7. The wind driven turbine of claim 1 wherein the turbine means is connected to a generator means for generation of electricity in response to rotary movement of the turbine means.

8. The wind driven turbine of claim 1 further including a secondary housing surrounding the housing and including a convergent inlet and an outlet, the convergent inlet being in general alignment with the primary inlet opening and the outlet being in general alignment with the outlet opening.

9. The wind driven turbine of claim 8 wherein the secondary housing is mounted for rotation about a vertical axis and includes sensing means for detecting the atmospheric wind direction, and drive means responsive to the sensing means and connected to the secondary housing to move the convergent inlet into general alignment with the detected wind direction.

10. The wind driven turbine of claim 8 wherein closures are provided for the inlet opening, the closures being movable between an open position where the inlet opening is unobstructed and a closed position where the inlet opening is closed to atmospheric wind so that wind flow into the turbine can be controlled.

11. The wind driven turbine of claim 8 wherein closures are provided for the outlet opening, the closures being movable between an open position where the outlet opening is unobstructed and a closed position where the outlet opening has no fluid communication with the atmosphere.

12. The wind driven turbine of claim 8 wherein the convergent inlet has a discharge with a width less than the width of the primary inlet opening and a height greater than the height of the primary inlet opening so that air bypassing the primary inlet can reach the secondary inlet openings.

* * * * *